(12) United States Patent
Jernigan, IV et al.

(10) Patent No.: US 8,176,246 B1
(45) Date of Patent: *May 8, 2012

(54) DISTRIBUTING LOOKUP OPERATIONS IN A STRIPED STORAGE SYSTEM

(75) Inventors: Richard P. Jernigan, IV, Sewickley, PA (US); Omprakaash Thoppai, Wexford, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,629

(22) Filed: Jul. 26, 2011

Related U.S. Application Data

(63) Continuation of application No. 12/020,949, filed on Jan. 28, 2008, now Pat. No. 7,996,607.

(51) Int. Cl.
*G06F 12/00* (2006.01)
(52) U.S. Cl. ......... 711/113; 711/114; 711/156; 711/202
(58) Field of Classification Search .................. None
See application file for complete search history.

(56) References Cited

U.S. PATENT DOCUMENTS

| | | |
|---|---|---|
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,155,835 A | 10/1992 | Belsan |
| 5,163,131 A | 11/1992 | Row et al. |
| 5,202,979 A | 4/1993 | Hillis et al. |
| 5,355,453 A | 10/1994 | Row et al. |
| 5,485,579 A | 1/1996 | Hitz et al. |
| 5,581,724 A | 12/1996 | Belsan et al. |
| 5,623,651 A | 4/1997 | Jernigan, IV |
| 5,701,516 A | 12/1997 | Cheng et al. |
| 5,802,366 A | 9/1998 | Row et al. |
| 5,819,292 A | 10/1998 | Hitz et al. |
| 5,897,661 A | 4/1999 | Baranovsky et al. |
| 5,931,918 A | 8/1999 | Row et al. |

(Continued)

FOREIGN PATENT DOCUMENTS

EP 0 892 347 1/1999

(Continued)

OTHER PUBLICATIONS

Administration Guide found at http://www.openafs.org/pages/doc/AdminGuide/auagd010.htm, visited on Mar. 2, 2005, 34 pages.

(Continued)

*Primary Examiner* — Shawn X Gu
(74) *Attorney, Agent, or Firm* — Cesari and McKenna, LLP

(57) ABSTRACT

The present invention provides a mechanism for storing and accessing attributes of a data container (e.g., characteristics such as a name of a data container used to perform a lookup operation against the data container) in cache memory within storage systems in a cluster of storage systems. Further, a mechanism is provided so that an attribute of a data container is inserted into a cache memory of preferably one storage system (in the cluster) that caches metadata of the data container (e.g., information describing the data container). As a result, a lookup operation for a data container is directed to and served by the storage system that caches the metadata and the attribute of the data container. The lookup request is not relayed to a storage system that maintains a central directory of attributes of all data containers in the cluster.

20 Claims, 8 Drawing Sheets

U.S. PATENT DOCUMENTS

| | | | |
|---|---|---|---|
| 5,941,972 | A | 8/1999 | Hoese et al. |
| 5,963,962 | A | 10/1999 | Hitz et al. |
| 5,987,477 | A | 11/1999 | Schmuck et al. |
| 6,032,216 | A | 2/2000 | Schmuck et al. |
| 6,038,570 | A | 3/2000 | Hitz et al. |
| 6,065,037 | A | 5/2000 | Hitz et al. |
| 6,134,293 | A | 10/2000 | Guendel |
| 6,173,293 | B1 | 1/2001 | Thekkath et al. |
| 6,275,898 | B1 | 8/2001 | DeKoning |
| 6,324,581 | B1 | 11/2001 | Xu et al. |
| 6,425,035 | B2 | 7/2002 | Hoese et al. |
| 6,502,166 | B1 | 12/2002 | Cassidy |
| 6,564,252 | B1 | 5/2003 | Hickman et al. |
| 6,581,135 | B2 | 6/2003 | Nakano et al. |
| 6,606,690 | B2 | 8/2003 | Padovano |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,697,846 | B1 | 2/2004 | Soltis |
| 6,721,764 | B2 | 4/2004 | Hitz et al. |
| 6,732,231 | B1 | 5/2004 | Don et al. |
| 6,868,417 | B2 | 3/2005 | Kazar et al. |
| 6,931,450 | B2 | 8/2005 | Howard et al. |
| 6,978,283 | B1 | 12/2005 | Edwards et al. |
| 7,010,528 | B2 | 3/2006 | Curran et al. |
| 7,038,058 | B2 | 5/2006 | Lee et al. |
| 7,055,058 | B2 | 5/2006 | Lee et al. |
| 7,159,093 | B2 | 1/2007 | Dalal et al. |
| 7,162,486 | B2 | 1/2007 | Patel et al. |
| 7,165,079 | B1 | 1/2007 | Chen et al. |
| 7,165,096 | B2 | 1/2007 | Soltis |
| 7,185,144 | B2 | 2/2007 | Corbett et al. |
| 7,194,597 | B2 | 3/2007 | Willis et al. |
| 7,231,412 | B2 | 6/2007 | Hitz et al. |
| 7,302,520 | B2 | 11/2007 | Kazar et al. |
| 7,366,837 | B2 | 4/2008 | Corbett et al. |
| 7,409,494 | B2 | 8/2008 | Edwards et al. |
| 7,409,497 | B1 | 8/2008 | Jernigan et al. |
| 7,412,496 | B2 | 8/2008 | Fridella et al. |
| 7,698,289 | B2 | 4/2010 | Kazar et al. |
| 7,698,334 | B2 | 4/2010 | Kazar et al. |
| 7,996,607 | B1* | 8/2011 | Jernigan et al. ............... 711/113 |
| 2002/0049883 | A1 | 4/2002 | Schneider et al. |
| 2003/0188045 | A1 | 10/2003 | Jacobson |
| 2004/0030668 | A1 | 2/2004 | Pawlowski et al. |
| 2004/0122917 | A1 | 6/2004 | Menon et al. |
| 2004/0133570 | A1 | 7/2004 | Soltis |
| 2004/0139167 | A1 | 7/2004 | Edsall et al. |
| 2005/0097260 | A1 | 5/2005 | McGovern et al. |
| 2005/0192932 | A1 | 9/2005 | Kazar et al. |
| 2006/0184587 | A1 | 8/2006 | Federwisch et al. |
| 2007/0088702 | A1 | 4/2007 | Fridella et al. |

FOREIGN PATENT DOCUMENTS

| | | |
|---|---|---|
| JP | 10003440 | 6/1998 |
| WO | WO 00/07101 | 2/2000 |

OTHER PUBLICATIONS

Auspex Systems, LFS—A Local File System for Multiprocessor NFS Network Servers, Dec. 1994, 6 pages.

Blasgen, M.W. et al., "System R : An architectural Overview", Reprinted from IBM Systems Journal vol. 20, No. 1, Feb. 1981, Copyright 1981, 1999, 22 pages.

Borenstein, Nathaniel S., "CMU's Andrew Project a Retrospective", Communications of ACM, 39(12), Dec. 1996, 33 pages.

Brinkmann, A. et al., Efficient Distributed Data Placement Strategies for Storage Area Networks, Proceedings of the Twelfth Annual ACM Symposium on Parallel Algorithms and Architectures, ACM, Jul. 2000, 10 pages.

Brown, Mark R. et al., The Alpine file system, ACM Transactions on Computing Systems, 3(4):261-293, Nov. 1985.

Carns, P. H., et al, "PVFS: A Parallel File System for Linux Clusters", Proceedings of the 4.sup.th Annual Linux Showcase and Conference, Atlanta, GA, Oct. 2000, pp. 317-327.

Celerra File Server Architecture for High Availability, EMC2 where information lives, Aug. 1999, 12 pages.

Chutani, Sailesh, et al., The Episode File System, In Proceedings of the USENIX, Jan. 1992, 18 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4), Sep. 1991, pp. 353-385.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Ganger, G. R. et al., "Disk Subsystem Load Balancing: Disk Striping vs. Conventional Data Placement", Proceedings of the 26$^{th}$ International Conference System Sciences, Wailea, Hawaii, IEEE, Jan. 5, 1993, 10 pages.

Gray, Jim, et al., The Recovery Manager of the System R Database Manager, ACM Computing Surveys, (13)2:223-242, Jun. 1981, 20 pages.

Hartman, John H. et al., Performance Measurements of a Multiprocessor Sprite Kernel, Proceedings of the USENIX Conference, Jun. 1990, 13 pages.

Hartman, J. H., et al., "Zebra: A Striped Network File System" Proceedings of the Usenix File Systems Workshop, Apr. 1998 pp. 1-9, XP002926950.

Hartman, J. H., et al. "The Zebra Striped Network File System" Dec. 1, 1993, Operating Systems Review, ACM, New York, NY, US, pp. 29-43, XP000418681, Issn: 0163-5908.

Hitz, Dave et al., File System Design for an NFS File Server Appliance, Technical Report 3002, Rev. C395, presented Jan. 19, 1994, 23 pages.

Ho, T. K., et al. "A Row Permutated Data Reorganization Algorithm for Growing Server-Less Video-on-Demand Systems", Third IEEE International Symposium on Cluster Computing and the Grid (CCGrid'03), IEEE/ACM, May 12, 2003, 8 pages.

Honicky, R. J., et al. "A Fast Algorithm for Online Placement and Reorganization of Replicated Data", Proceedings of the International Parallel and Distributed Processing Symposium, (IPDPS), IEEE, Apr. 2003, 10 pages.

Howard, John H., An Overview of the Andrew File System, Carnegie Mellon University, CMU-ITC-88-062, Feb. 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, Jun. 1990, 13 pages.

Kazar, Michael L., Synchronization and Caching Issues in the Andrew File System, Carnegie Mellon University, CMU-ITC-88-063, Feb. 1988, 12 pages.

Ligon, W. B. III, et al., "Implementation and Performance of a Parallel File System for High Performance Distributed Application", Proceedings of the fifth IEEE International Symposium on High Performance Distributed Computing, Aug. 1996, 10 pages.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Miller, Ethan L., et al., RAMA: A File System for Massively Parallel Computers, 12.sup.th IEEE Symposium on Mass Storage Systems, Monterey CA, Apr. 1993, pp. 163-168.

Morris, James H., et al., Andrew: A Distributed Personal Computing Environment, Comm. of the ACM, vol. 29, Mar. 1986, pp. 184-201.

Nelson, Michael et al., "Caching in the Sprite Network File System", ACM, Nov. 1987, pp. 3-4.

Network Appliance, Inc., Notification of Transmittal of the International Search Report and the Written Opinion of the International Searching Authority, or the Declaration, International Application No. PCT/US2005/030889, International Filing Date Aug. 31, 2005, Date of Mailing Jan. 13, 2006, 14 pages.

Network Appliance, Inc., Notification of Transmittal of the International Search Report and the Written Opinion of the International Searching Authority, or the Declaration, International Application No. PCT/US2005/031220, International Filing Date Sep. 1, 2005, Date of Mailing Oct. 18, 2006, 12 pages.

Network Appliance, Inc., Notification of Transmittal of the International Search Report and the Written Opinion of the International Searching Authority, or the Declaration, International Application No. PCT/US2006/016055, International Filing Date Apr. 27, 2006, Date of Mailing Nov. 11, 2006, 10 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Performance Without Compromise: The Virtual Storage Architecture 1997, 11 pages.

Quinlan, Sean, A Cached WORM File System, Software-Practice and Experience, 21(12):1289-1299, Dec. 1991.

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, Jun. 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.

Ross, R. B. et al., "Using the Parallel Virtual File System", Jul. 2002, 31 pages.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), Feb. 1989.

Satyanarayanan, M., et al., Coda: A highly available file system for a distributed workstation environment Carnegie Mellon University, CMU-ITC, Jul. 1989, 5 pages.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.

Sidebotham, Bob, Volumes: The Andrew File System Data Structuring Primitive, EEUG Conference Proceedings, Manchester, UK, Aug. 1986.

Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.

Subramanian, Muralidhar, et al., Performance Challenges in Object-Relational DBMSs, Data Engineering Journal 22, Feb. 1999 pp. 28-32.

Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.

Welch, Brent B., et al., Pseudo-File-Systems, Computer Science Division, Department of Electrical Engineering and Computer Sciences. Univ. of CA, Berkley, Oct. 1989, 22 pages.

West, Michael, et al. The ITC Distributed File System: Prototype and Experience, Carnegie-Mellon University, Technical Report CMU-ITC-040, Mar. 1985, 17 pages.

\* cited by examiner

DISTRIBUTING LOOKUP OPERATIONS IN A STRIPED STORAGE SYSTEM

RELATED APPLICATIONS

This application is a continuation of U.S. patent application Ser. No. 12/020,949, now U.S. Pat. No. 7,996,607, filed on Jan. 28, 2008, entitled "DISTRIBUTING LOOKUP OPERATIONS IN A STRIPED STORAGE SYSTEM VIRTUAL PORTS IN CLUSTERED SYSTEMS," by Richard P. Jernigan, IV et al., which is related to U.S. patent application Ser. No. 11/119,277, now U.S. Pat. No. 7,698,334, entitled "SYSTEM AND METHOD FOR MULTI-TIERED METADATA CACHING AND DISTRIBUTION IN A CLUSTERED COMPUTER ENVIRONMENT," by Michael Kazar, et al., and is also related to U.S. patent application Ser. No. 11/119,278, now U.S. Pat. No. 7,698,289, entitled "STORAGE SYSTEM ARCHITECTURE FOR STRIPING DATA CONTAINER CONTENT ACROSS VOLUMES OF A CLUSTER," filed Apr. 29, 2005, all of which are hereby incorporated by reference.

FIELD OF THE INVENTION

The present invention relates to clustered computer environments and, more particularly, to distributing lookup operations in a cluster of storage systems.

BACKGROUND OF THE INVENTION

A storage system is a processing system adapted to store and retrieve data on behalf of one or more client processing systems ("clients") in response to external input/output (I/O) requests received from clients. Data storage space has one or more storage "volumes" comprising of a cluster of physical storage disks, defining an overall logical arrangement of storage space.

A storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the data container.

To distribute the load for a single data container (such as a file or a logical unit) among a plurality of storage systems, a storage system may employ a striping technique so that a data container is striped (or apportioned) across a plurality of volumes configured as a striped volume set (SVS). In a SVS, each volume is serviced by a different storage system. A technique for data container striping is described in a commonly-owned U.S. Pat. No. 7,698,289, issued Apr. 13, 2010, entitled "STORAGE SYSTEM ARCHITECTURE FOR STRIPING DATA CONTAINER CONTENT ACROSS VOLUMES OF A CLUSTER", which disclosure is incorporated herein.

Referring now to FIG. 1, storage system architecture comprises a plurality of nodes 200 interconnected as a cluster 100. Each node services a volume (volumes are not shown in FIG. 1). Each node represents a storage system. One or more volumes are distributed across the cluster 100 and are organized as a striped volume set (SVS) (as shown in FIG. 4). The volumes are configured to store content of data containers, such as files and logical units, served by the cluster in response to multi-protocol data access requests issued by clients (e.g., client 180). An exemplary striped volume set 400 is shown in FIG. 4. The SVS includes one metadata volume (MDV) (e.g., 460) storing frequently changed data (e.g., metadata), which includes information describing data containers, including, for example, access control lists and directories, associated with all data containers stored on the SVS) as well as a central directory that stores mappings between a name of a data container and an inode data number. An inode number refers to an index of an inode data structure. An inode data structure contains metadata about a data container. This mapping is typically consulted during such a common operation as a lookup request. For example, given a name of a data container, MDV is searched to find the name of a data container and then an inode number associated with that name.

A storage system in the cluster (e.g., cluster 100) supports many incoming requests. Common operations supported by a storage system include a request to create a data container, delete a data container, perform a lookup using a data container name in a central directory (e.g., a data structure that stores mappings between a name of a data container and an associated inode number on MDV), get metadata of a data container, read from a data container, and write to a data container. The lookup operation is particularly important since it is performed before several other operations. For example, prior to attempting to create a new data container with a data container name, a client issues a lookup request to determine if a data container name already exists. Once the data container is created, a lookup request is issued to find the created data container within a directory in order to issue multiple write calls against a data container handle to populate the new data container with data. As described above, during a lookup operation, the mapping between the names of data containers and inode numbers is consulted to determine an inode number associated with a particular data container name. Since the mappings for all data container names are conventionally stored on a single central directory node in a cluster, this approach to storing mappings introduces a potentially significant bottleneck resulting in all common directory operations, such as "read directory", "lookup", "create", "delete", and "rename" being serviced by the same node. This arrangement places a substantial load on a central directory node serving the MDV. Since a lookup operation can be performed more frequently than other operations, optimizing the lookup operation is important.

SUMMARY OF THE INVENTION

The present invention provides a novel mechanism for storing and accessing attributes of a data container (e.g., characteristics such as a name of a data container used to perform a lookup operation against the data container) in cache memory within storage systems in a cluster of storage systems. According to embodiments described herein, a mechanism is provided so that an attribute of a data container is inserted into a cache memory of preferably one storage system (in the cluster) that caches metadata of the data container (e.g., information describing the data container). As a result, a lookup operation for a data container is directed to and served by the storage system that caches the metadata and the attribute of the data container. Unlike the prior art described above, the lookup request is not relayed to a storage system that maintains a central directory of attributes of all data containers in the cluster. This, in turn, accelerates a lookup operation and increases efficiency of cache memory because, after data container creation, a lookup of the data container can be serviced from the cache memory without relay. Furthermore, implementation of the invention can include other techniques for providing efficiency in accessing data containers. For clarity, it should be understood that metadata is information that changes more frequently than attributes of a data container, which by their nature are more static. For example, metadata can change with each modification of the data container, while its "name" attribute will typically persist for the life of the data container.

According to a novel mechanism described herein, when a data container is created at a storage system that maintains a central directory, the storage system uses an attribute of a data container (such as a name of a data container) to determine which storage system will cache the attribute of a data container in preparation for the lookup request that typically occurs after a request for metadata of a data container. In one implementation, this can be done, for example, by applying a hash function to the attribute and generating a first hash value. A storage system that services a request for metadata is typically chosen based on the inode number of the data container (as described herein, an inode number refers to an index of an inode data structure, which contains metadata about a data container). To ensure that a lookup request for a data container and request for metadata for the data container are sent to and served by the same storage system in the cluster without being relayed to the storage system that maintains a central directory, the storage system that maintains the central directory allocates an inode number for the data container attribute based on the data container attribute. As mentioned herein, a storage system that will cache the attribute of a data container is chosen by generating a first hash value. In one implementation, the storage system that maintains the central directory allocates an inode number for a data container as follows: it uses a hash function (which can be the same or different from the one used to hash a name of the data container) to hash available inode numbers until the resulting hash value is equal to the first hash value described above. The resulting hash value is called a second hash value. An inode number that generates a second hash value (which is equal to the first hash value) after applying a function is allocated for the data container name. As a result, both a lookup request and a request for metadata are sent to the same storage system without being relayed to the storage system that maintains the central directory.

Furthermore, the novel mechanism described herein limits the amount of work that needs to be done during removal of a data container attribute (e.g., name) from the cache, since only one storage system needs to be contacted in the cluster. Moreover, according to embodiments of the present invention, the need to erase an attribute of a data container (such as a name) when a data container is deleted can be avoided by applying the following rule. Even upon a successful cache-hit operation when looking up an attribute of a data container, the storage system that caches the attribute cannot use the cached entry unless it also has metadata for the data container. The lack of metadata implicitly invalidates any cached data container attribute without the need to explicitly to erase the attribute. This optimization minimizes the cache-invalidation work, which is typically required during data container deletion.

Those skilled in the art would understand that although embodiments of the present invention are described in the context of caching a name of a data container, any attribute of a data container that can be used to perform a lookup operation against the data container can be employed to implement the novel mechanism.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF PREFERRED EMBODIMENTS

The description that follows is divided into several sections. First, cluster environment and storage system architecture are described. Then description of the data container creation operation according to a related commonly-owned U.S. Pat. No. 7,698,334 is provided. Finally, the description of the data container creation operation that improves cache efficiency is provided according to embodiments of the present invention.

A. Cluster Environment

Figure 1:
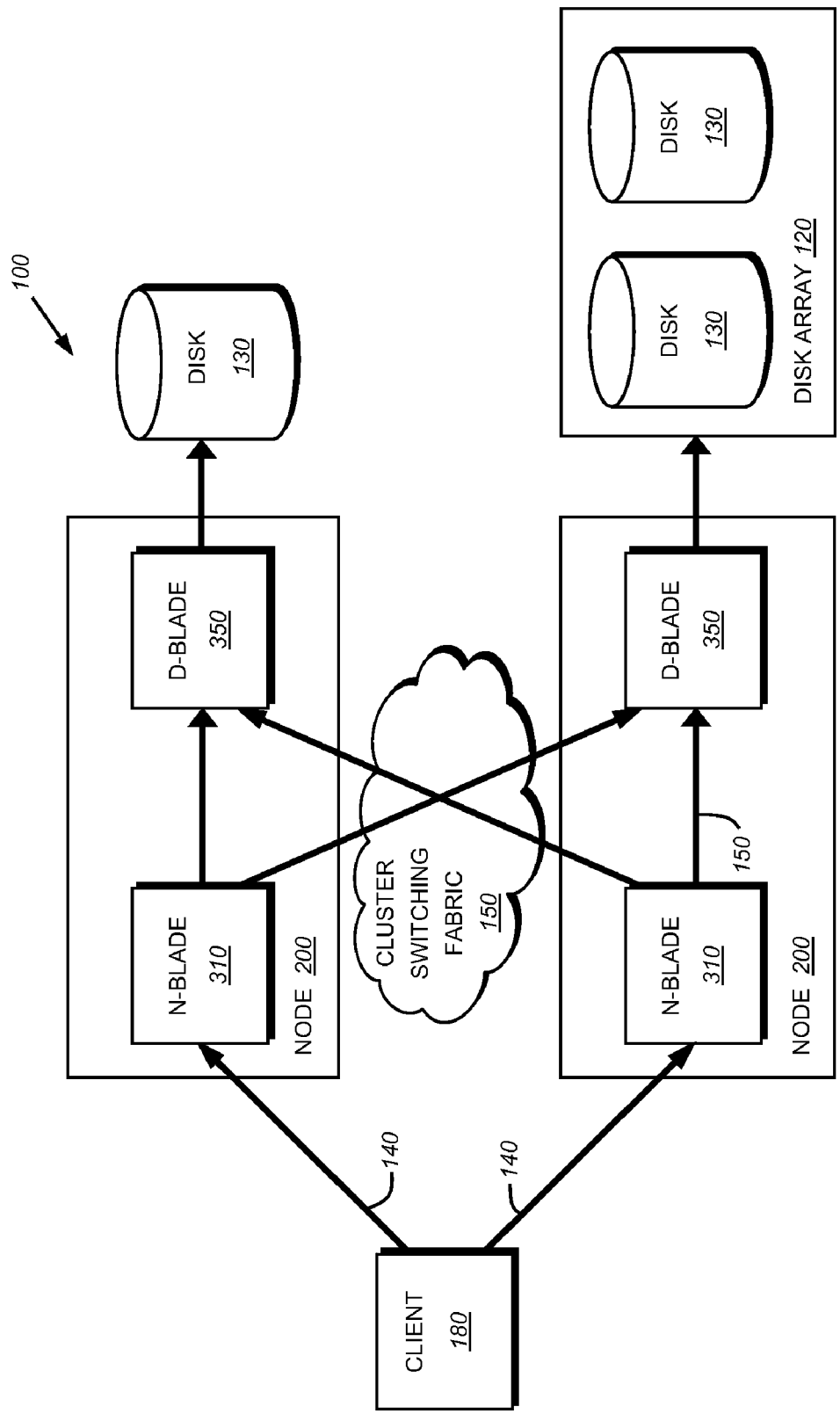
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide distributed storage system architecture of the cluster 100. To that end, each node 200 is generally organized as a multi-protocol engine embodied as a network element (N-blade 310) and a disk element (D-blade 350). The N-blade 310 receives a multi-protocol data access request from a client, converts that request into a cluster fabric (CF) message and redirects the message to an appropriate D-blade of the cluster. D-blade 350 connects to one or more storage devices, such as disks 130 of a disk array 120. The nodes 200 are interconnected by a cluster switching fabric 150, which, in the illustrative embodiment, may be embodied as a Gigabit Ethernet switch. It should be noted that while there is shown an equal number of N-blades and D-blades in the illustrative cluster 100, there may be differing numbers of N and/or D-blades in accordance with various embodiments of the present invention. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only. Furthermore, in alternative embodiments, a node may represent an N-blade or a D-blade.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel Protocol (FCP), when accessing information in the form of blocks.

Each node can be a storage system that provides clients with a file-level access to data stored in a set of mass storage devices, such as magnetic or optical storage disks, tapes, or non-volatile memory (and thus can be implemented as a network-attached storage (NAS) device). Alternatively, a storage system can provide clients with a block-level access to stored data (and implemented as a Storage Area Network (SAN) device). Storage system can provide clients with both file-level access and block-level access.

B. Storage System Node

Figure 2:
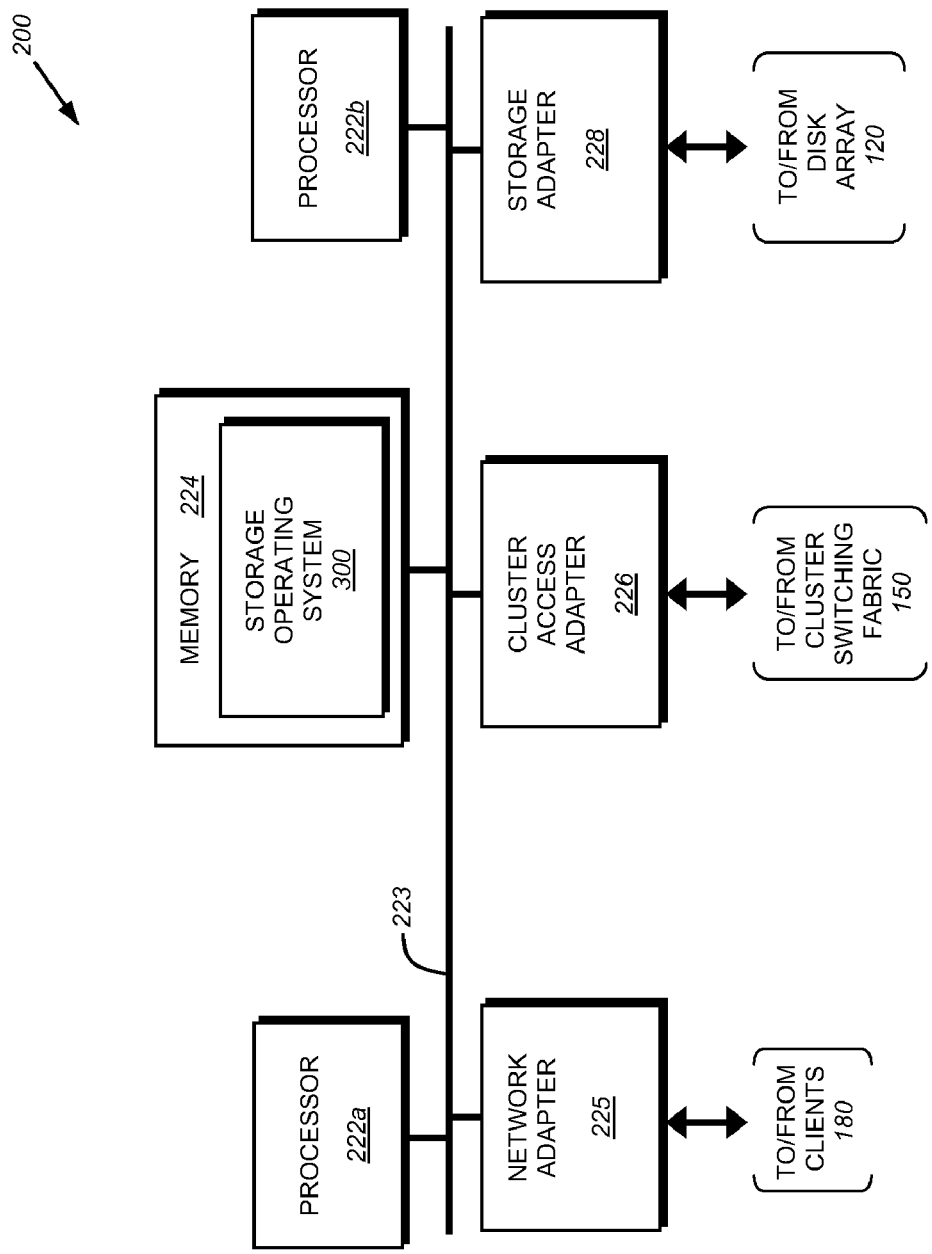
FIG. 2 is a schematic diagram of a node in accordance to an embodiment of the present invention.

FIG. 2 is a schematic block diagram of a node 200 that is illustratively embodied as a storage system comprising a plurality of processors 222a,b, a memory 224, a network adapter 225, a cluster access adapter 226, and a storage adapter 228 interconnected by a system bus 223. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120 (as shown in FIG. 1). The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements, for example, a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a data structure in which names and links to other files and directories are stored. The virtualization module(s) allow the file system to further logically organize information as a hierarchical structure of blocks on the disks that are exported as named logical unit numbers (luns).

In the illustrative embodiment, the storage operating system 300 is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "Data ONTAP™" is employed, it should be taken broadly to refer to any storage operating system that is otherwise adaptable to the teachings of this invention.

Figure 3A:
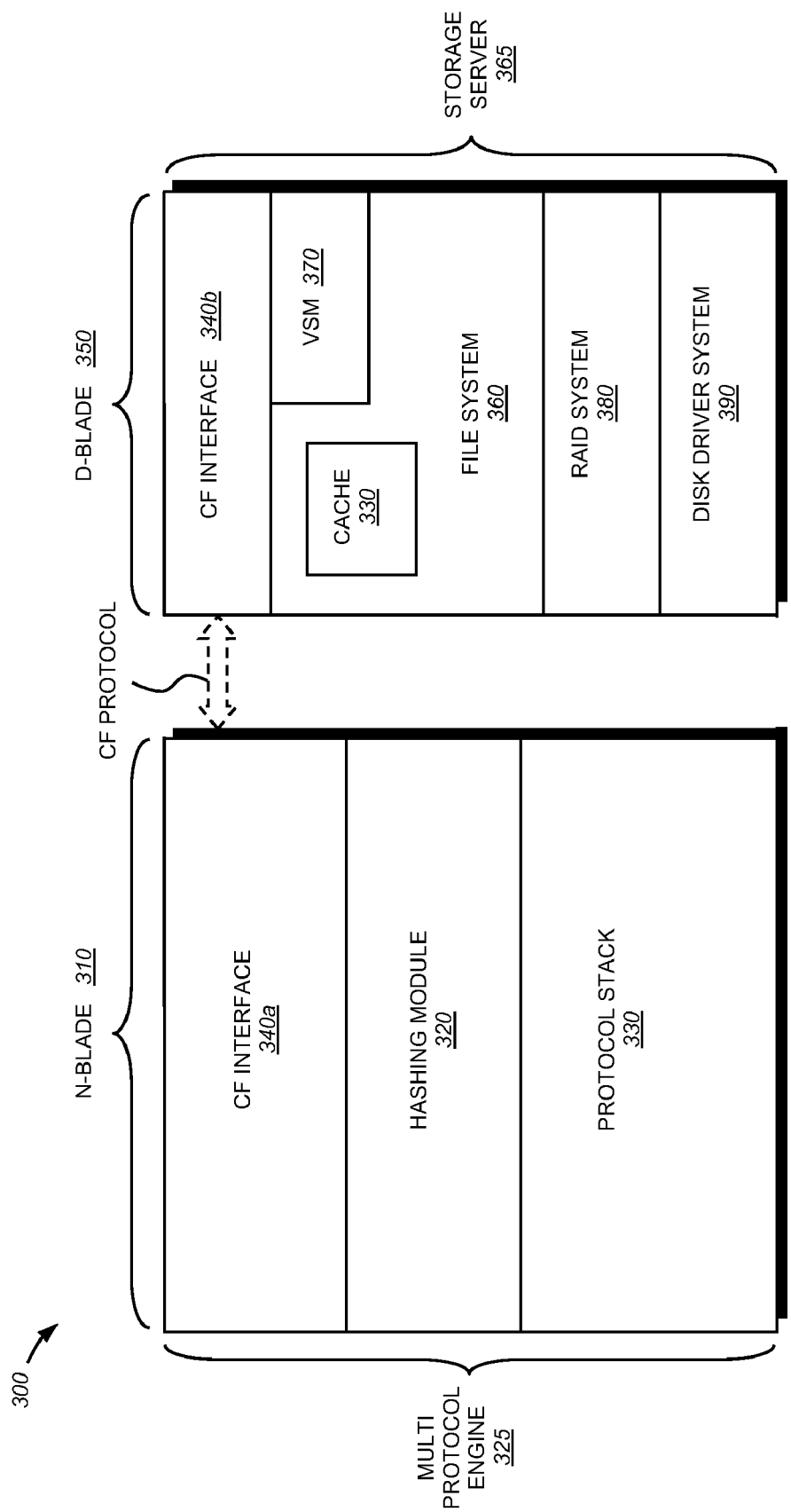
FIG. 3A is a schematic block diagram of a storage operating system that may be advantageously used with the present invention.

FIG. 3A is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine 325 includes a network driver layer (e.g., an Ethernet driver), a network protocol layer (e.g., an Internet Protocol layer and its supporting transport mechanisms, the Transport Control Protocol layer and the User Datagram Protocol layer), as well as a file system protocol server layer (e.g., a CIFS server, a NFS server, etc.) organized as a network protocol stack 330. The multiprotocol engine 325 also executes a hashing module 320. The hashing module 320 is responsible for hashing a name of a data container upon receiving a request to create a data container. The hashing module 320 provides the resulting value as an identifier (ID) of the volume that will cache the name of the data container.

In addition, the storage operating system 300 includes a series of software layers organized to form a storage server 365 that provides data paths for accessing information stored on the disks 130 of the node 200. To that end, the storage server 365 includes a file system module 360 in cooperation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) of the present invention. As described further herein, the VSM cooperates with the file system 360 to enable storage server 365 to service a volume of the SVS.

The storage operating system 300 further comprises a cache 330 adapted to store various attributes for data containers as well as data container names. The storage operating system 300 further executes a volume location database (VLDB) storing a plurality of entries (the database is not shown in FIG. 3A). Each entry in the VLDB includes a SVS ID field and one or more sets of striping rules. The SVS ID field contains the ID of a SVS which is specified in a data container handle (as will be described below) provided to client 180 by storage system 200.

The file system 360 is illustratively a message-based system that provides logical volume management capabilities for use in access to the information stored on the storage devices, such as disks. That is, in addition to providing file system semantics, the file system 360 provides functions normally associated with a volume manager. The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file metadata (such as creation time (timestamps), access permissions, size and block location). Metadata can be defined as frequently changed data. The file system uses files to store metadata describing the layout of its file system; these metadata files include, among others, an inode file. A file handle, i.e., an identifier that includes an inode number, is used to retrieve an inode from disk.

The CF interface module 340 implements the CF protocol for communicating file system commands among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340b on D-blade 350 de-encapsulates the CF message and processes the file system command.

Figure 3B:
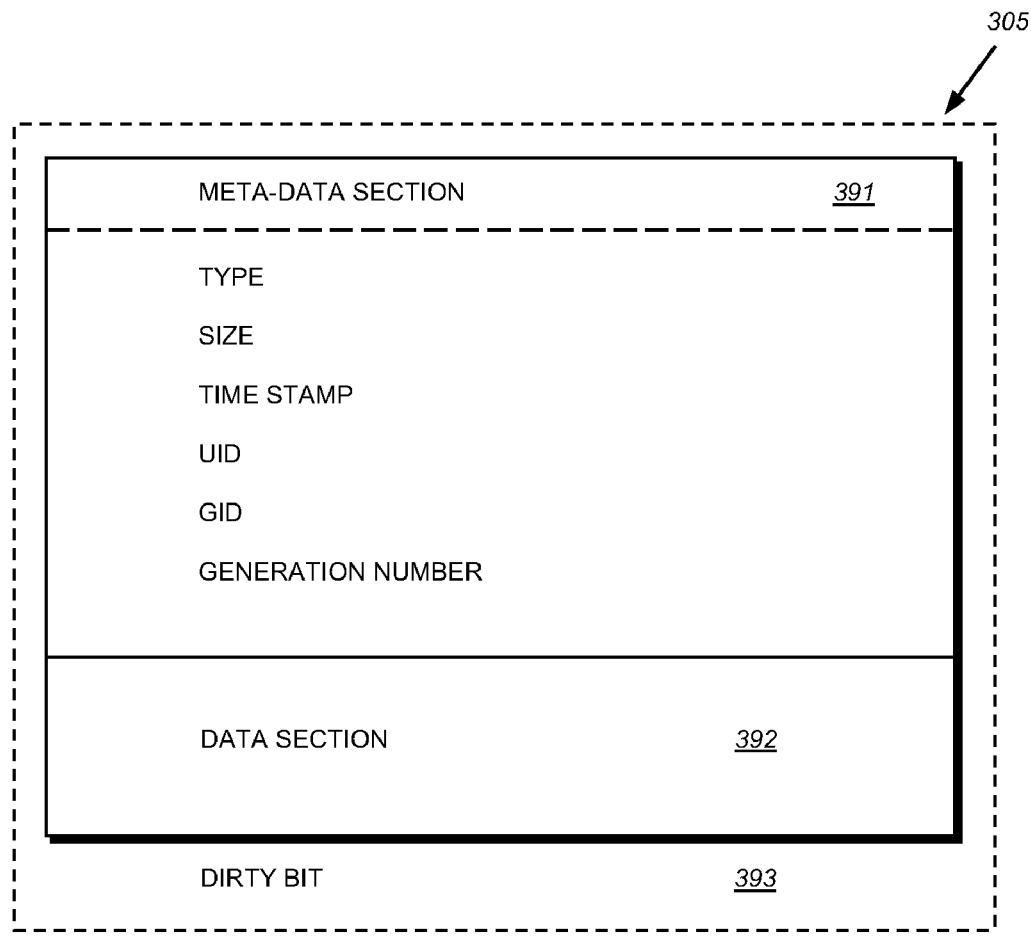
FIG. 3B is a schematic block diagram of an exemplary inode data structure in accordance with an embodiment of the present invention.

In the illustrative embodiment, a data container is represented in the write-anywhere file system as an inode data structure adapted for storage on the disks 130. FIG. 3B is a schematic block diagram of an inode structure 305, which preferably includes a metadata section 391 and a data section 392. The information stored in the metadata section 391 of each inode structure 305 describes the data container (e.g., a file) and, as such, includes the type (e.g., regular, directory, vdisk) of file, its size, time stamps (e.g., access and/or modification time) and ownership, i.e., user identifier (UID) and group ID (GID), of the file. The metadata section 391 also includes a generation number, and a metadata invalidation flag field. Metadata invalidation flag field is used to indicate whether metadata in the inode is usable or whether it should be re-acquired from the MDV. The contents of the data section 392 of each inode data structure may be interpreted differently depending upon the type of file (inode) defined within the type field. For example, the data section 392 of an inode contains metadata controlled by the file system, whereas the data section of a regular inode contains file system data. In this latter case, the data section 392 includes a representation of the data associated with the file. Specifically, the data section 392 of a regular on-disk inode may include file system data or pointers, the latter referencing 4 kB data blocks on disk used to store the file system data.

D. Storage System Architecture

As described herein, the storage system architecture comprises two or more volumes distributed across a plurality of nodes 200 of cluster 100. The volumes are organized as a SVS and configured to store content of data containers, such as files and logical unit numbers (LUN), served by the cluster in response to multi-protocol data access requests issued by clients 180. Notably, the content of each data container is apportioned among the volumes of the SVS to thereby improve the efficiency of storage service provided by the cluster. The SVS comprises a metadata volume (MDV) and one or more data volumes (DV). The MDV is configured to store a canonical, or definitive, copy of certain metadata, including access control lists (ACLs) and directories, associated with all files stored on the SVS, whereas each DV is configured to store, at least, data content of those files. For each data container stored on the SVS, one volume of the SVS is designated to store (or "cache") certain, frequently changed data, such as metadata, including, for example, time stamps and data container length, associated with that data container, to offload access requests that would otherwise be directed to the MDV.

E. Metadata Caching

Figure 4:
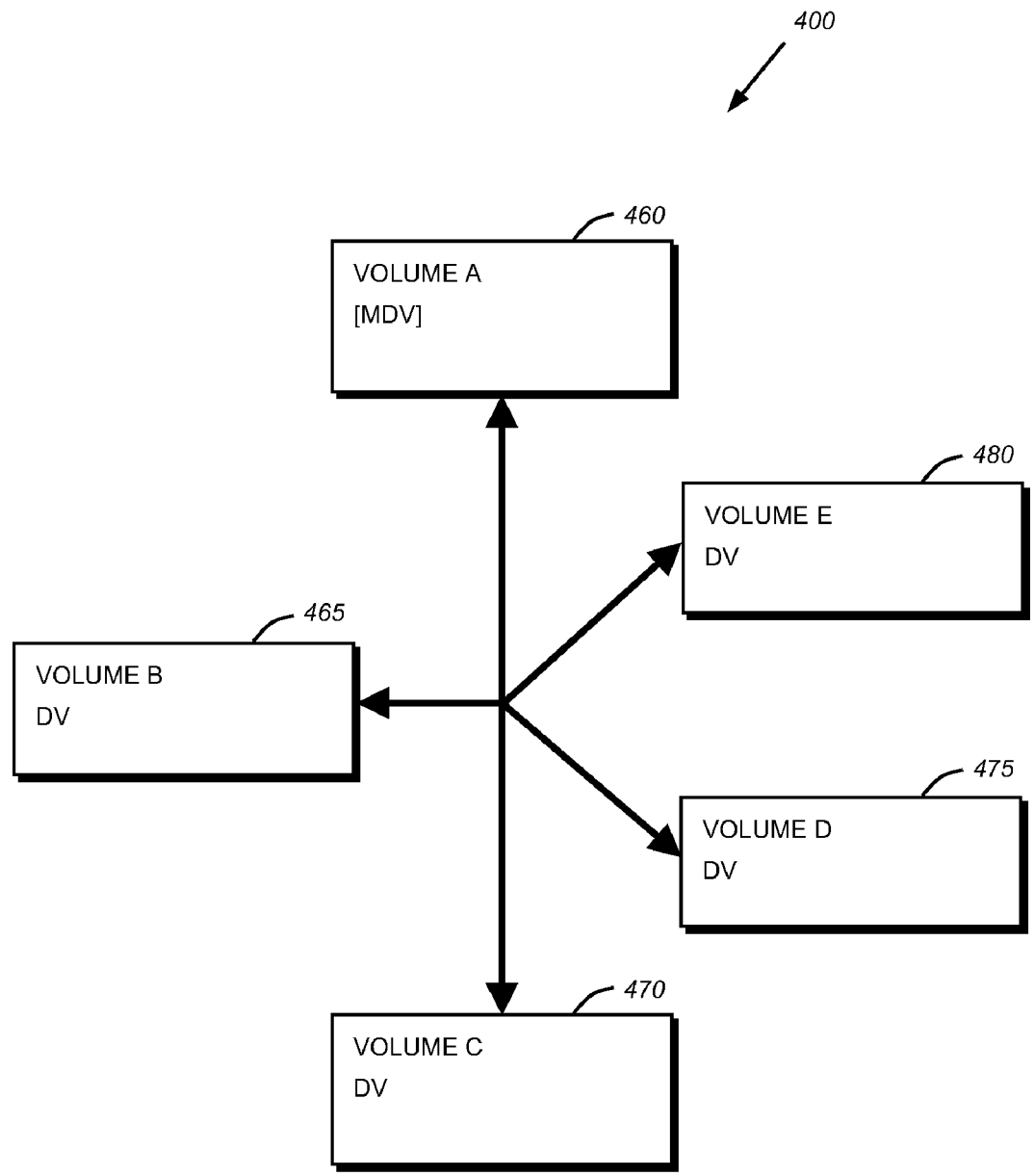
FIG. 4 is a block diagram of a striped volume set (SVS) where a volume serves as a container metadata volume (CMV)

FIG. 4 is a schematic block diagram of an exemplary five volume SVS environment in accordance with an embodiment described in a commonly-owned U.S.1928 No. 7,698,334, issued Apr. 13, 2010, entitled "SYSTEM AND METHOD FOR MULTI-TIERED METADATA CACHING AND DISTRIBUTION IN A CLUSTERED COMPUTER ENVIRONMENT," by Michael Kazar, et al., the contents of which are hereby incorporated by reference.

The SVS 400 comprises five volumes, namely volume A 460, volume B 465, volume C 470, volume D 475 and volume E 480. It should be noted that five volumes are shown for illustrative purposes only and that the teachings of the present invention may be utilized with SVSs having any number of volumes. In the illustrative SVS 400, volume A 460 is designated the MDV, with the other four volumes functioning as DVs associated with the SVS. Twelve data containers, e.g., files (files 1-12), are illustratively stored on the volumes of the SVS, wherein each volume serves as the container metadata volume (CMV) for any data container whose first stripe is stored therein. Notably, the CMV caches rapidly-changing metadata for the data container (such as time stamps). Thus, for example, volume B 465 serves as the CMV for data containers 1, 5, 9. Similarly, volume C 470 serves as the CMV for data containers 2, 6 and 10, volume D 475 serves as the CMV for data containers 3, 7 and 11 and volume E 480 serves as the CMV for data containers 4, 8 and 12. Volume A 460, which serves as the MDV for the SVS does not, in the illustrative embodiment, serve as the CMV for any data container. In alternate embodiments, the MDV may serve as the CMV for data containers. By distributing the role of the CMV among the SVS volumes, each volume serves as a CMV for an approximately equal number of data containers.

The SVS is associated with a set of striping rules that define a stripe algorithm, a stripe width and an ordered list of volumes within the SVS. The striping rules for each SVS are illustratively stored as an entry of a database, such as (VLDB) and accessed by SVS ID. An exemplary entry in VLDB entry (not shown in Figures) may include a SVS ID field and one or more sets of striping rules. In alternate embodiments additional fields may be included. The SVS ID field contains the ID of a SVS which, in operation, is specified in the data container handle. Each set of striping rules may include a stripe width field, a stripe algorithm ID field, an ordered list of volumes field, and, in alternate embodiments, additional fields. The striping rules contain information for identifying the organization of a SVS. For example, the stripe algorithm ID field identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which data container content is apportioned as stripes across the plurality of volumes of the SVS. The stripe width field specifies the size/width of each stripe. The ordered list of volumes field contains the IDs of the volumes comprising the SVS. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

F. SVS Operations

Figure 5:
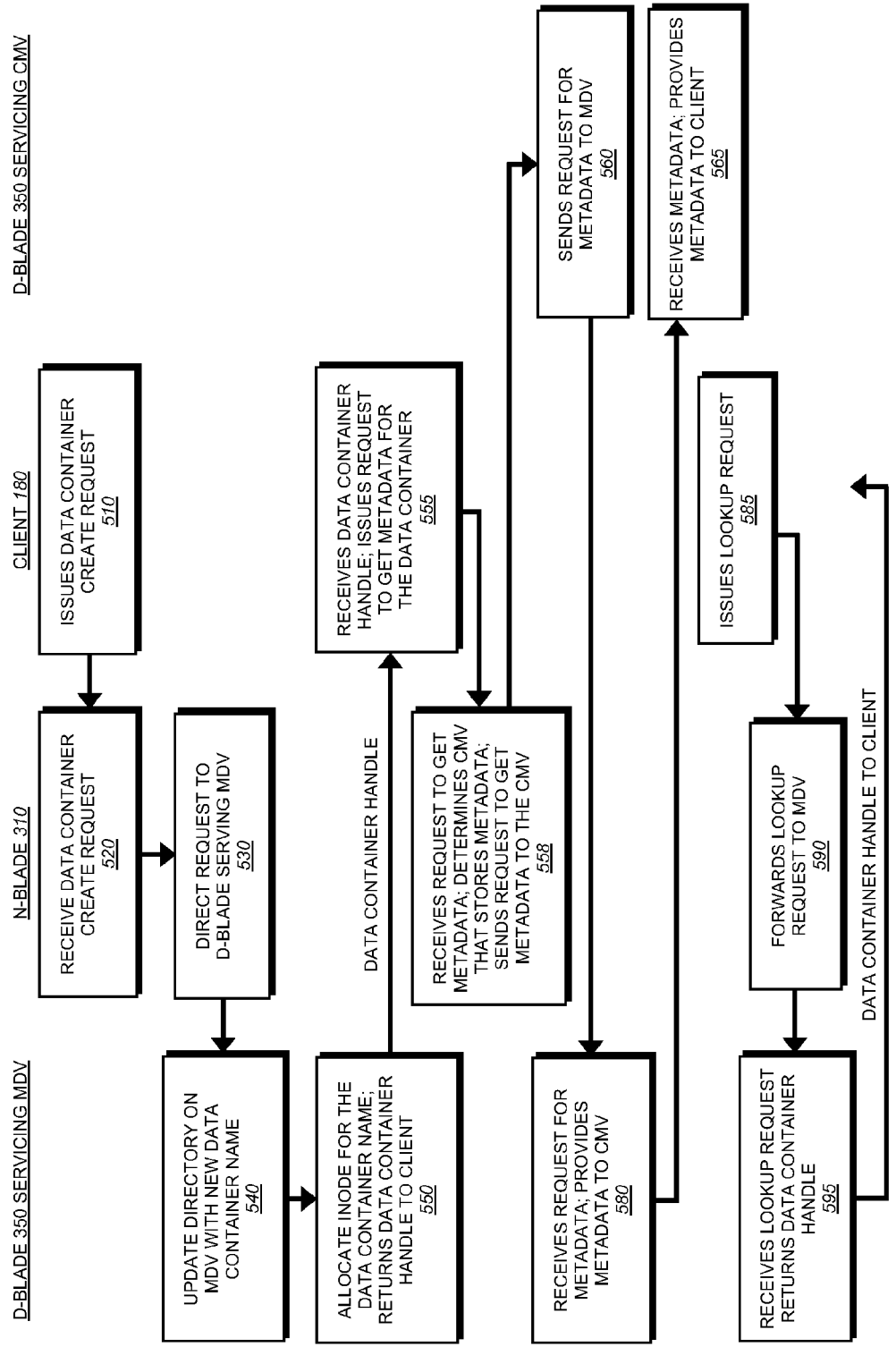
FIG. 5 is an event diagram of a known procedure for processing a data container create request.

SVS operations include, among others, create data container, delete data container, retrieve attributes of data container, write/modify attributes of data container, read data container and write data container operations. FIG. 5 is an event diagram of the procedure for creating a new data container and getting attributes for the created data container performed by the storage system architecture and is described in the commonly-owned U.S. Pat. No. 7,698,334, entitled "SYSTEM AND METHOD FOR MULTI-TIERED METADATA CACHING AND DISTRIBUTION IN A CLUSTERED COMPUTER ENVIRONMENT." This description is provided in order to distinguish SVS operations described in the above-referenced commonly-owned patent application with SVS operations according to embodiments of the present invention.

The procedure begins in step 510 where N-blade 310 receives a request to create a new data container (e.g., file) from, e.g., a client 180 which sends a "create data container" request to node 200. As part of the request, a data container handle is sent. The data container handle may include an SVS ID field, an inode number field, a unique-identifier (ID) field, a striped flag field, and a striping epoch number field. These fields are not shown in FIGS. 1 through 6. The SVS ID field contains a global identifier (within the cluster 100) of the SVS within which the data container resides. The inode number field contains a number of an inode (within an inode file) pertaining to the data container. The unique-ID field contains a monotonically increasing number that uniquely identifies the data container handle. The unique-ID is particularly useful in the case where an inode number has been deleted, reused and reassigned to a new data container. The unique-ID distinguishes that reused inode number in a particular data container from a potentially previous use of those fields. The striped flag field is illustratively a Boolean value that identifies whether the data container is striped or not. The striping epoch number field indicates the appropriate striping technique to use with this data container for embodiments where the SVS utilizes differing striping techniques for different data containers.

N-blade 310 receives the data container handle and extracts the SVS ID and the epoch number and determines which volume stores metadata information (MDV volume). N-blade may determine which volume of a SVS 400 is the MDV by examining the ordered list of volumes within the SVS. Such a list can be stored in memory 224. The first volume listed in the ordered list of volumes can be the MDV, although it will be understood to those skilled in the art that any volume position within the ordered list can be designated as the MDV 405.

The N-blade 310 translates the "create data container" request to a procedure call (LPC or RPC). Upon receiving the create data container procedure call, the VSM 370 of the D-blade 350 processes that call by updating the directory (i.e., creating a new directory entry for the data container) on the MDV in step 540 and, in step 550, allocating an inode for the data container. The allocated inode is preferably selected from among available inodes in the SVS using, e.g., any conventional inode selection technique. Note that each volume of the SVS 400 is allocated the same inode for the newly created data container. Moreover, the inode is allocated in the same position/location of the inode file for each volume, i.e., the file inode on each volume is allocated the same inode index to the inode file. The VSM 370 of the MDV 405 completes data container creation by, e.g., instructing the file system 360 operating on the D-blade 350 to create a data container using the allocated inode. The N-blade returns a data container handle to the client 180. The data container handle indicates the inode number corresponding to the data container name and the volume ID where the data container is created.

Client 180 receives the data container handle and issues a request to get metadata of the data container to N-blade (at step 555). The N-blade receives the request along with a data container handle (step 558). A Locate( ) function is provided that enables the VSM 370 and other modules (such as those of N-blade 310) to locate a D-blade 350 and its associated volume of a SVS 400 in order to service an access request to a data container. The Locate( ) function, for example, takes as arguments, an SVS ID, an offset within the data container, the inode number for the data container, and a set of striping rules, and returns the volume on which that offset begins within the SVS 400. To determine the location of a D-blade 350 to which to transmit a CF message 400, the N-blade 310 may first retrieve a SVS entry to acquire the striping rules (and list of volumes) associated with the SVS. The N-blade 310 then executes the Locate( ) function to identify the appropriate volume to which to direct an operation. The N-blade 310 then transmits the message to the D-blade 350.

D-blade serving the volume that is selected to store metadata for the data container receives the request for metadata from the N-blade. Since the data container has just been created, metadata for the data container are not stored at the volume. Thus, to obtain data container metadata, a request to the D-blade serving the MDV has to be made. The VSM 370 at the D-blade serving the CMV identifies the MDV. To this end, the VSM 370 extracts the SVS ID and the epoch number and determines which volume is MDV. At step 560, the D-blade serving the CMV sends a request to retrieve metadata to the D-blade serving the MDV. The D-blade serving the MDV receives the corresponding request (step 580) and uses the data container handle indicated in the request to identify the inode number corresponding to the data container name. The D-blade uses the inode number to retrieve metadata for the data container identified by a data container name (metadata section 391 of the inode 305 is shown in FIG. 3B). The D-blade sends the metadata to the D-blade serving the CMV. The D-blade serving the CMV receives metadata (step 565) and caches the metadata in cache memory (e.g., cache 330). The D-blade serving CMV, in turn, provides the metadata to client 180. When the client 180 issues a lookup request (step 585) to the data container to find the data container using its infrequently changed attribute (e.g., its name), the request is first sent to N-blade, and then to the D-blade serving the MDV (step 590). The D-blade serving the MDV returns the data container handle to the client 180 (step 595).

Thus, according to the mechanism described in the U.S. Pat. No. 7,698,334, each Data Volume (DV) in the striped volume set (SVS) may serve as the CMV, which stores frequently changed data, such as metadata for the data container, including data container stamps and data container length associated with that data container. This mechanism is used to distribute client access requests for frequently changed data in the cluster that would otherwise be directed to the MDV during performance of I/O operations (e.g., read and write requests). The above-described mechanism does not address optimizing performance of lookup operations against a data container using its infrequently changed attribute, such as a name, and thus does not concern with populating a cache with a name of a data container. Furthermore, caching a name of a data container in order to optimize lookup requests may present a number of challenges. First, when a client issues a lookup request, there are a large number of nodes to choose from, and it is not apparent how the client can choose the best node to service a particular lookup request. If, however, requests are distributed to all nodes randomly, then cache efficiency suffers. For example, a request is sent to a node serving volume 465 (in FIG. 4), which has a cache miss. Thus, the lookup request is relayed to the central directory node (e.g., serving MDV). Then, a node serving volume 465 populates its cache with the data container name-to-inode mapping. A second request is made for the same data container name, but this time a node serving volume 480 is randomly chosen instead to service the request. It has a cache miss and relays the request to the node serving the directory (volume 460). If it were known that a node serving volume 465 needs to be chosen both times to service the lookup request, the cache at node serving volume 465 would have sufficed the request, thereby preventing an unnecessary relay and of the request and a redundant consumption of the cache space at a node serving volume 480.

Moreover, multiple lookup requests of the same data container name need to occur before the cache is beneficial. As shown in the above example, any operation that looks up a data container name exactly once is gaining no benefit from the cache because the cache is initially unpopulated, and therefore is guaranteed to miss on the first lookup. In fact, that one lookup is actually slower than not having a cache at all because it has to go through a node that does not store the name of a data container only to be relayed to the node that stores the data container name-to-inode mapping for completion.

Finally, caching a name of a data container raises the problem of maintaining the cache properly. When a data container is deleted, its name has to be expunged from any caching nodes. Otherwise, the name would still appear for data container operations, even though the data container is gone. Similarly, if a data container is renamed, then the original name has to be expunged from all caches. While renaming a data container is not a common operation, deleting a data container is a common operation. Thus, the burden of purging names of data containers from the cache during deletion of data container can outweigh the benefit of maintaining a lookup cache.

Accordingly, due to the challenges associated with maintaining a lookup cache, the mechanism described in the U.S. Pat. No. 7,698,334, does not offload client lookup requests from the MDV to find the data container by its name before directing read and write requests to that data container. As described herein, storing the data container name within a single node (e.g., node storing a central directory on MDV) introduces a potentially significant bottleneck since all common data container operations are serviced by the same node. When data container operations are repetitive, such a bottleneck can represent a significant performance problem.

Unlike the technique described in the U.S. Pat. No. 7,698,334, the present invention provides a novel mechanism for storing and accessing attributes of a data container (e.g., characteristics, such as a name of a data container used to perform a lookup operation against the data container) in cache memory within storage systems in a cluster of storage systems. For clarity, it should be understood that metadata is information that changes more frequently than attributes of a data container, which by their nature are more static. For example, metadata can change with each modification of the data container while its "name" attribute will typically persist for the life of the data container.

According to embodiments described herein, a mechanism is provided so that an attribute of a data container is inserted into a cache memory of preferably one storage system (in the cluster) that caches metadata of the data container (e.g., information describing the data container). As a result, a lookup operation for a data container is directed to and served by the storage system that caches the metadata and the attribute of the data container. Unlike the technique described above, the lookup request is not relayed to a storage system that maintains a central directory of attributes of all data containers in the cluster. This, in turn, accelerates a lookup operation and increases efficiency of cache memory because, after data container creation, a lookup of the data container can be serviced from the cache memory without relay.

According to a novel mechanism described herein, when a data container is created at a storage system that maintains a central directory, the storage system uses an attribute of a data container (such as a name of a data container) to determine which storage system will cache the attribute of a data container in preparation for the lookup request that typically occurs after a request for metadata of a data container. In one implementation, this can be done, for example, by applying a hash function to the attribute and generating a first hash value. A storage system that services a request for metadata is typically chosen based on the inode number of the data container (as described herein, an inode number refers to an index of an inode data structure, which contains metadata about a data container). To ensure that a lookup request for a data container and request for metadata for the data container are sent to and served by the same storage system in the cluster without being relayed to the storage system that maintains a central directory, the storage system that maintains the central directory allocates an inode number for the data container attribute based on the data container attribute. As mentioned herein, a storage system that will cache the attribute of a data container is chosen by generating a first hash value. In one implementation, the storage system that maintains the central directory allocates an inode number for a data container as follows: it uses a hash function (which can be the same or different from the one used to hash a name of the data container) to hash available inode numbers until the resulting hash value is equal to the first hash value described above. The resulting hash value is called a second hash value. An inode number that generates a second hash value (which is equal to the first hash value) after applying a function is allocated for the data container name. As a result, both a lookup request and a request for metadata are sent to the same storage system without being relayed to the storage system that maintains the central directory.

Furthermore, the novel mechanism described herein limits the amount of work that needs to be done during removal of a data container attribute (e.g., name) from the cache, since only one storage system needs to be contacted in the cluster. Moreover, according to embodiments of the present invention, the need to erase an attribute of a data container (such as a name) when a data container is deleted can be avoided by applying the following rule. Even upon a successful cache-hit operation when looking up an attribute of a data container, the storage system that caches the attribute cannot use the cached entry unless it also has metadata for the data container. The lack of metadata implicitly invalidates any cached data container attribute without the need to explicitly to erase the attribute. This optimization minimizes the cache-invalidation work, which is typically required during data container deletion.

Figure 6:
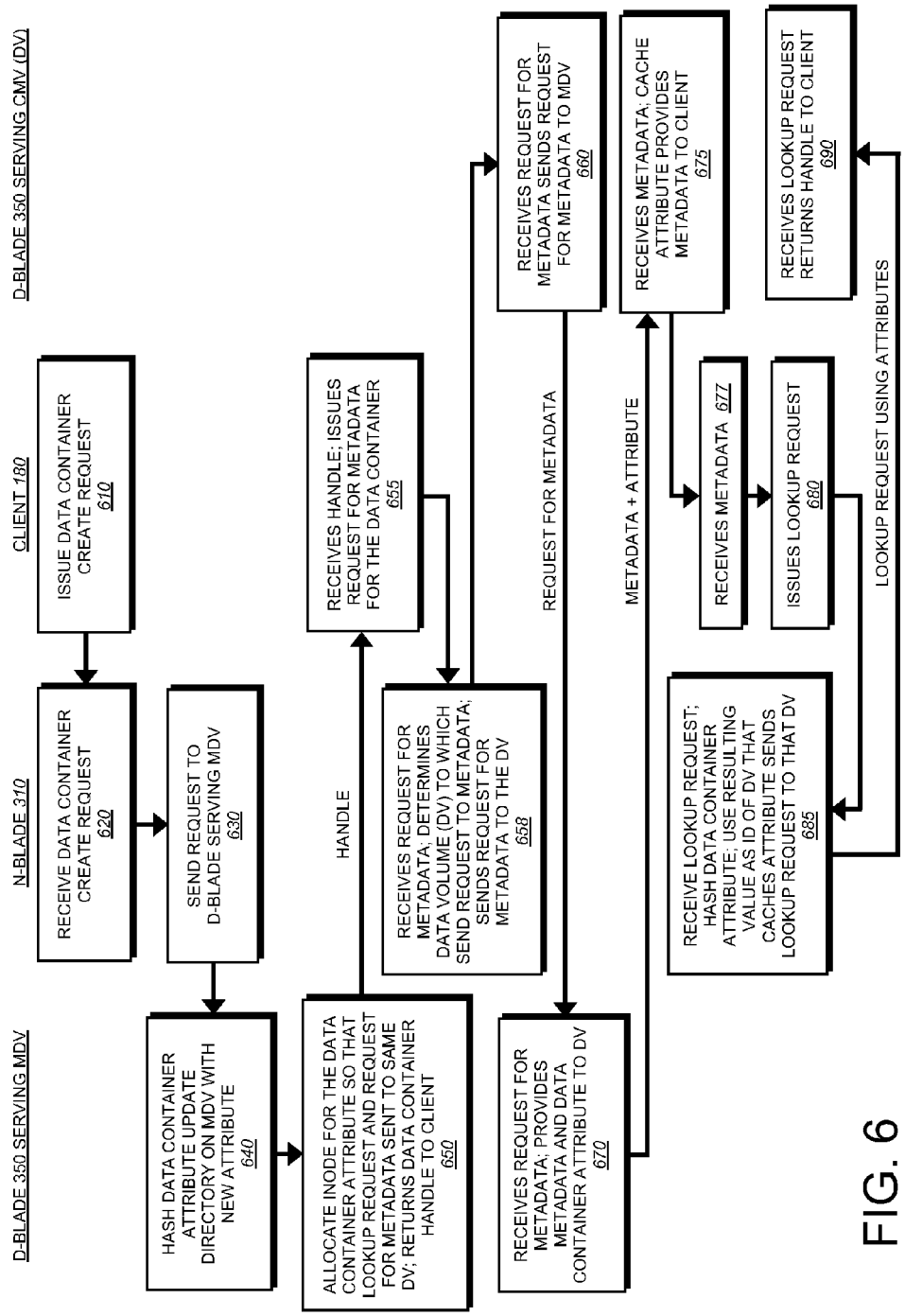
FIG. 6 is an event diagram of a procedure for processing a data container create request according to an embodiment of the present invention.

Referring now to FIG. 6, it illustrates an event diagram of the procedure for distributing lookup operations in the cluster and improving cache efficiency according to embodiments of the present invention. The procedure begins in step 610 where N-blade 310 receives a request to create a new data container (e.g., file) from, e.g., a client 180 which sends a "create data container" request to node 200. As described herein in reference to FIG. 5, as part of the request, a data container handle is sent. The data container handle may include a SVS ID field, an inode number field, a unique-identifier (ID) field, a striped flag field, and a striping epoch number field. N-blade extracts the SVS ID and the epoch number and determines which volume is the MDV volume. N-blade may determine which volume of a SVS 400 is the MDV by examining the ordered list of volumes within the SVS. Such a list can be stored in memory 224 of N-blade 310. The first volume listed in the ordered list of volumes can be the MDV, although it will be understood to those skilled in the art that any volume position within the ordered list can be designated the MDV 405.

The N-blade 310 translates the "create data container" request to a procedure call (LPC or RPC) and then determines an action it should take. For example, in response to a create data container request, the N-blade issues a corresponding create data container procedure call to the MDV 405 or, more specifically, the VSM 370 of the D-blade 350 serving the MDV.

Upon receiving the "create data container" procedure call, the VSM 370 of the D-blade 350 processes that call by updating the central directory (a data structure that stores mappings between data container attribute and an inode number on D-blade serving MDV) (at step 640). Thus, in effect a new directory entry for the data container is created. According to the novel mechanism described herein, the D-blade serving MDV applies a function (such as a hash function) to the data container attribute that defines a data container (such as a name). The resulting value is used later during a lookup operation as an ID of the volume that will cache the data container name and serve lookup requests for the data container based on its name. For purposes of this description, the generated value is called "hash value 1." Those skilled in the art would understand that although embodiments of the present invention describe using hash functions, any other suitable method for turning data into another number can be used with the present invention.

In addition, the data container name is stored in a memory structure (e.g., memory 224) on a D-blade serving the MDV. Later the data container name is provided from the memory 224 by the D-blade serving the MDV to the D-blade serving the CMV in response to the request to provide metadata (as will be described below).

At step 650, as part of a data container creation, the D-blade serving MDV allocates an available inode number for the data container name. The chosen inode number will be used to determine an ID of a node that will cache metadata for the data container and thus service requests to get metadata. As mentioned herein, an ID of a node chosen to service a lookup operation represents a value generated as a result of applying a function to a data container name (such as a hash function). To ensure that the two operations (get metadata and lookup of a data container based on its name) are serviced by the same node that caches the name, the D-blade serving MDV (e.g., central directory node that creates a new data container) selects an inode number of the new data container based on the incoming data container name. To this end, in one implementation, the central directory node uses a hash function (which can be the same or different from the one used to hash a name of the data container) to hash available inode numbers until the resulting hash value is equal to the "hash value 1" described above. The resulting hash value is called "hash value 2." An inode number that generates a hash value 2 (which is equal to hash value 1) after applying a function is allocated for the data container name (step 650).

Thus, embodiments of the present invention select the inode number associated with a data container name based on the incoming data container name to ensure that a request to provide metadata and a lookup request for the data container are sent to the same node to which the attribute that defines the data container (such as a name of a data container) was proactively inserted.

The D-blade serving the MDV completes data container creation by, e.g., instructing the file system 360 operating on the D-blade 350 to create a data container using the allocated inode. The N-blade returns a data container handle to the client 180. The data container handle indicates the inode number corresponding to the data container name and the volume ID where the data container is created.

Client 180 receives the data container handle and issues a request to N-blade to get metadata of the data container (at step 655). The N-blade receives the request and a data container handle (step 658). D-blade 350 that will cache metadata for this data container is has an ID equal to the hash value 2 generated as a result of applying a function to an inode number allocated for the data container attribute.

D-blade serving the CMV selected to cache metadata receives the request for metadata from the N-blade (step 660). Since the data container has just been created, metadata for the data container are not stored at the CMV. Thus, to obtain metadata of the data container, a request to the D-blade serving the MDV has to be sent.

At step 660, the D-blade serving the CMV that is selected to cache metadata for the data container sends a metadata retrieval request to the D-blade serving the MDV. The D-blade serving the MDV receives the request (step 670) and uses a data container handle indicated in the request to identify the inode number corresponding to the data container name. The D-blade uses the inode number to retrieve metadata (from the inode data structure having the inode number) for the data container identified by the data container name. According to embodiments of the present invention, the D-blade serving the CMV that caches the metadata also retrieves the data container attribute that defines the data container from the D-blade serving the MDV, caches the data container attribute in the cache memory (e.g., cache 330) of D-blade serving CMV (at step 675). D-blade then provides metadata to the client 180. Thus, the data container attribute that defines the data container is proactively inserted into the cache at the CMV in preparation for the lookup request that is anticipated to occur immediately after data container creation (for example, to find the newly-created data container in order to perform multiple write operations against a data container handle to populate the new data container with data).

The next step is to ensure that lookup requests for a data container are sent to the same node that caches the metadata of the data container. When the client 180 issues a lookup request to the data container based on its attribute (step 680), the request is received by the N-blade (step 685). The hashing module 320 of the N-blade, in turn, hashes the attribute to be looked up (step 685) and selects the node to be accessed for lookup based on the resulting hash value. Since the node that caches the metadata and the attribute in step 675 was selected based on the inode number, and the inode number was chosen so that hashing the inode number and hashing the attribute produced the same resulting value (e.g., hash value 1 and hash value 2, which are equal to each other), the lookup request based on a data container attribute is sent (step 685) to the same node that caches the data container attribute and the metadata for the created data container. As a result, the lookup of the newly-created data container can be serviced from the cache of a node, other than the central directory node serving the MDV, without the need to relay the request to the central directory node serving the MDV (step 690). Furthermore, the described novel mechanism eliminates a cache-miss on a first lookup request since the cache is already populated with a data container attribute used to perform a lookup operation again a data container (e.g., name of a data container). This accelerates the lookup operation, and increases the cache hit-rate enormously due to the frequency of lookup operations that usually occur immediately following data container creation.

Figure 7:
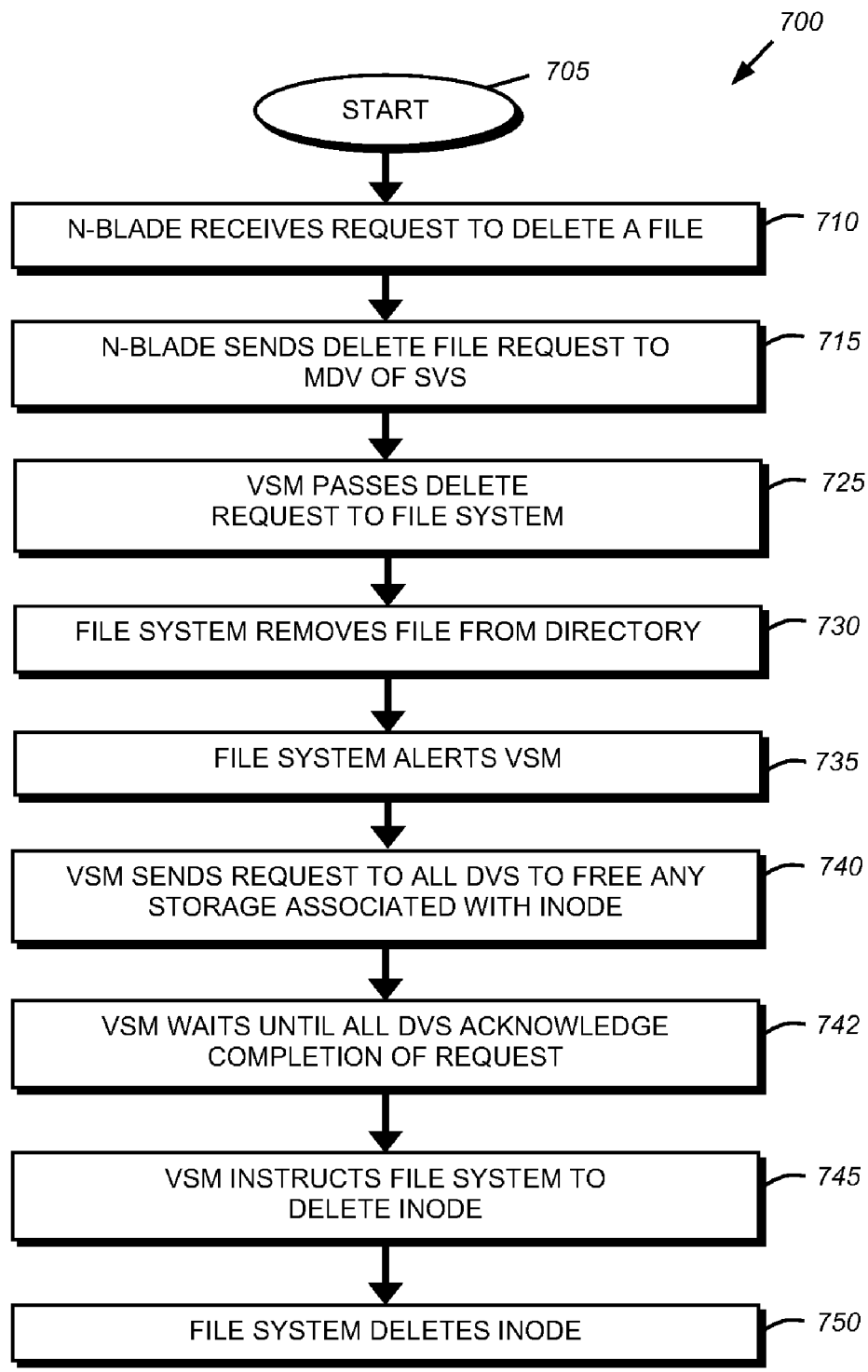
FIG. 7 is a flowchart detailing the steps of a procedure for deleting a data container.

FIG. 7 is a flowchart detailing the steps of a procedure 700 for deleting a data container in accordance with a technique described in a commonly-owned U.S. Pat. No. 7,698,289. The procedure 700 begins in step 705 and continues to step 710 where an N-blade receives a client request to delete a data container. In step 715, the N-blade re-directs the request as a delete data container procedure call to the VSM 370 of the appropriate D-blade serving the MDV 405 of a SVS 400, as described herein. In step 725, the VSM passes a corresponding delete request to the file system 360 via, e.g., a conventional IPC mechanism such as issuing a procedure call or passing a message. In step 730, the file system processes the delete request up to the point of actually removing the inode from the file system. At this point, the file system alerts the VSM 370 that it has reached this particular state (step 735) via, e.g., the IPC mechanism. In step 740, the VSM sends requests to all DVs in the SVS to free the storage associated with the inode. Then, in step 742, the VSM waits until all of the DVs have acknowledged completion of the request. In step 745, the VSM instructs the file system 360 to delete the inode and, in response, the file system deletes the inode in step 750. The procedure then completes in step 755. Typically, when a data container is deleted, its name needs to be expunged from any caching nodes. Otherwise, the name would still appear to indicate the data container exists even though the data container is deleted. Because of the burden to purge data container names from the cache during data container deletion, the benefit of having a lookup cache is typically lost.

According to embodiments of the present invention, the need to purge data container names from the cache during data container deletion can be eliminated by using the following rule. When a lookup request is made to the D-blade serving the CMV, even upon a successful cache-hit operation, the D-blade that caches metadata and data container attribute cannot use the cached entry unless it also has metadata for the inode cached. Since the metadata is usually invalidated during a data container name deletion, the lack of metadata implicitly invalidates any cached data container names that would refer to the data container name. As a result, the need to purge the data container name during a data container delete operation is eliminated.

Thus, a novel mechanism for storing and accessing attributes of a data container (e.g., characteristics such as a name of a data container used to perform a lookup operation against the data container) in cache memory within storage systems in a cluster of storage systems is described. According to embodiments described herein, a mechanism is provided so that an attribute of a data container is inserted into a cache memory of preferably one storage system (in the cluster) that caches metadata of the data container (e.g., information describing the data container). As a result, a lookup operation for a data container is directed to and served by the storage system that caches the metadata and the attribute of the data container. Unlike the existing techniques described above, the lookup request is not relayed to a storage system that maintains a central directory of attributes of all data containers in the cluster. This, in turn, accelerates a lookup operation and increases efficiency of cache memory because, after data container creation, a lookup of the data container can be serviced from the cache memory without relay.

The foregoing description has been directed to particular embodiments of this invention. It will be apparent, however, that other variations and modifications may be made to the described embodiments, with the attainment of some or all of their advantages. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

Furthermore, although the present invention has been described in the context of "files", the invention is not limited to such. Indeed, operations to create, delete, perform a lookup can be applied to any data container. In addition, those skilled in the art would understand that any attribute other than a name of a data container can be used to issue a lookup request against a data container.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

What is claimed is:

1. A method for distributing lookup operations in a cluster, comprising:
    maintaining, at a D-module of the cluster, mappings between a data container attribute of a data container and an inode value of the data container;
    determining at the D-module an identification (ID) of a second D-module of the cluster for caching the data container attribute;
    selecting the inode value for the data container attribute, wherein the second D-module services a lookup request for the data container attribute and services a metadata request for the data container;
    receiving the metadata request of the data container from an N-module of the cluster; and
    in response to receiving the lookup request, satisfying the lookup request by the second D-module.

2. The method of claim 1, further comprising configuring the N-module to receive a request from a client and configuring the N-module to communicate with the second D-module.

3. The method of claim 1, further comprising configuring each of the D-modules to communicate with the N-module.

4. The method of claim 1, wherein the data container attribute comprises a name of the data container.

5. The method of claim 1, wherein the data container attribute comprises infrequently changing data and wherein metadata comprises data that is changed more frequently than the infrequently changing data.

6. The method of claim 1, further comprising applying a first function to the data container attribute to determine the ID of the second D-module, wherein the inode value for the data container attribute is selected so that upon application of a second function on the inode value for the data container attribute, a value is selected equal to the determined ID, whereby the lookup request and the metadata request are directed to the second D-module without sending the lookup request and the metadata request to the D-module maintaining the mappings.

7. The method of claim 1, further comprising:
    in response to receiving the lookup request for the data container attribute, determining by the second D-module whether requested metadata for the data container attribute is cached at the D-module; and
    if the metadata is not cached, avoiding deletion of the requested data container attribute.

8. The method of claim 1, wherein an inode value comprises an index of an inode data structure configured to store metadata about the data container.

9. The method of claim 1, wherein the data container comprises a file.

10. A system configured to distribute lookup operations in a cluster, comprising:
    a D-module of the cluster configured to maintain mappings between a data container attribute of a data container and an inode value of the data container;
    the D-module further configured to determine an identification (ID) of a second D-module of the cluster for caching the data container attribute;
    the D-module further configured to select the inode value as the data container attribute, wherein the second D-module services a lookup request for the data container attribute and services a metadata request for the data container;
    an N-module of the cluster configured to send the metadata request of the data container; and
    the second D-module further configured to, in response to receiving the lookup request, satisfy the lookup request.

11. The system of claim 10, wherein the N-module is configured to receive a request from a client and further configured to communicate with the second D-module.

12. The system of claim 10, wherein each of the D-modules is further configured to communicate with the N-module.

13. The system of claim 10, wherein the data container attribute comprises a name of the data container.

14. The system of claim 10, wherein the data container attribute comprises infrequently changing data and wherein metadata comprises data that is changed more frequently than the infrequently changing data.

15. The system of claim 10, wherein the D-module is further configured to apply a first function to the data container attribute to determine the ID of the second D-module, wherein the inode value for the data container attribute is selected so that upon application of a second function on the inode value for the data container attribute, a value is selected equal to the determined ID, whereby the lookup request and the metadata request are directed to the second D-module without sending the lookup request and the metadata request to the D-module maintaining the mappings.

16. The system of claim 10, further comprising:
    the second D-module further configured to, in response to receiving the lookup request for the data container attribute, determine whether requested metadata for the data container attribute is cached at the D-module, wherein if the metadata is not cached, deletion of the requested data container attribute is avoided.

17. The system of claim 10, wherein an inode value comprises an index of an inode data structure configured to store metadata about the data container.

18. The system of claim 10, wherein the data container comprises a file.

19. A non-transitory computer-program product embodied in a computer readable medium, comprising:
  program instructions that maintain, at a D-module of a cluster, mappings between a data container attribute of a data container and an inode value of the data container;
  program instructions that determine at the D-module an identification (ID) of a second D-module of the cluster for caching the data container attribute;
  program instructions that select the inode value for the data container attribute, wherein the second D-module services a lookup request for the data container attribute and services a metadata request for the data container;
  program instructions that receive the metadata request of the data container from an N-module of the cluster; and
  program instructions that, in response to receiving the lookup request, satisfy the lookup request by the second D-module.

20. The computer-program product of claim 19, further comprising program instructions that apply a first function to the data container attribute to determine the ID of the second D-module, wherein the inode value for the data container attribute is selected so that upon application of a second function on the inode value for the data container attribute, a value is selected equal to the determined ID, whereby the lookup request and the metadata request are directed to the second D-module without sending the lookup request and the metadata request to the D-module maintaining the mappings.

* * * * *